United States Patent [19]

Thompson

[11] 4,372,737
[45] Feb. 8, 1983

[54] METHOD AND APPARATUS FOR FORMING A PLASTIC FLUID CONTAINER WITH AN INTEGRAL HANDLE

[75] Inventor: Kenneth P. Thompson, Canton, N.C.

[73] Assignee: Champion International Corporation, Stamford, Conn.

[21] Appl. No.: 282,791

[22] Filed: Jul. 13, 1981

Related U.S. Application Data

[62] Division of Ser. No. 178,525, Aug. 15, 1980, Pat. No. 4,334,942.

[51] Int. Cl.³ ............................................. B29C 17/00
[52] U.S. Cl. .................................... 425/393; 425/394; 425/398
[58] Field of Search ................ 264/296, 318; 156/217, 156/220, 227; 425/393, 394, 398

[56] References Cited

U.S. PATENT DOCUMENTS

| | | | |
|---|---|---|---|
| 3,116,002 | 12/1963 | Crawford | 229/17 |
| 3,120,335 | 2/1964 | Egleston et al. | 229/43 |
| 3,928,522 | 12/1975 | Farvel | 264/296 |
| 3,944,642 | 3/1976 | Uhlig | 264/296 |
| 4,126,262 | 11/1978 | Thompson | 229/176 |
| 4,214,697 | 7/1980 | Manning | 229/528 |

*Primary Examiner*—James H. Derrington
*Attorney, Agent, or Firm*—Evelyn M. Sommer

[57] ABSTRACT

A process and apparatus is disclosed for thermoforming an all plastic carton used to house a fluid with integral, kidney-shaped depressions in adjacent side walls of the carton to serve as handle members to aid in pouring the fluid contents from the carton. A pair of mandrels are inserted through opposite ends of a tubular enclosure formed from the carton blank. The mandrels are provided with a toroidal shaped cavity where they meet inside the enclosure. The enclosure is heated and a pair of complementally shaped, dies are rotated exteriorly of the enclosure into the toroidal cavity in the mandrels on adjacent sidewalls of the carton to form the handle depressions.

4 Claims, 7 Drawing Figures

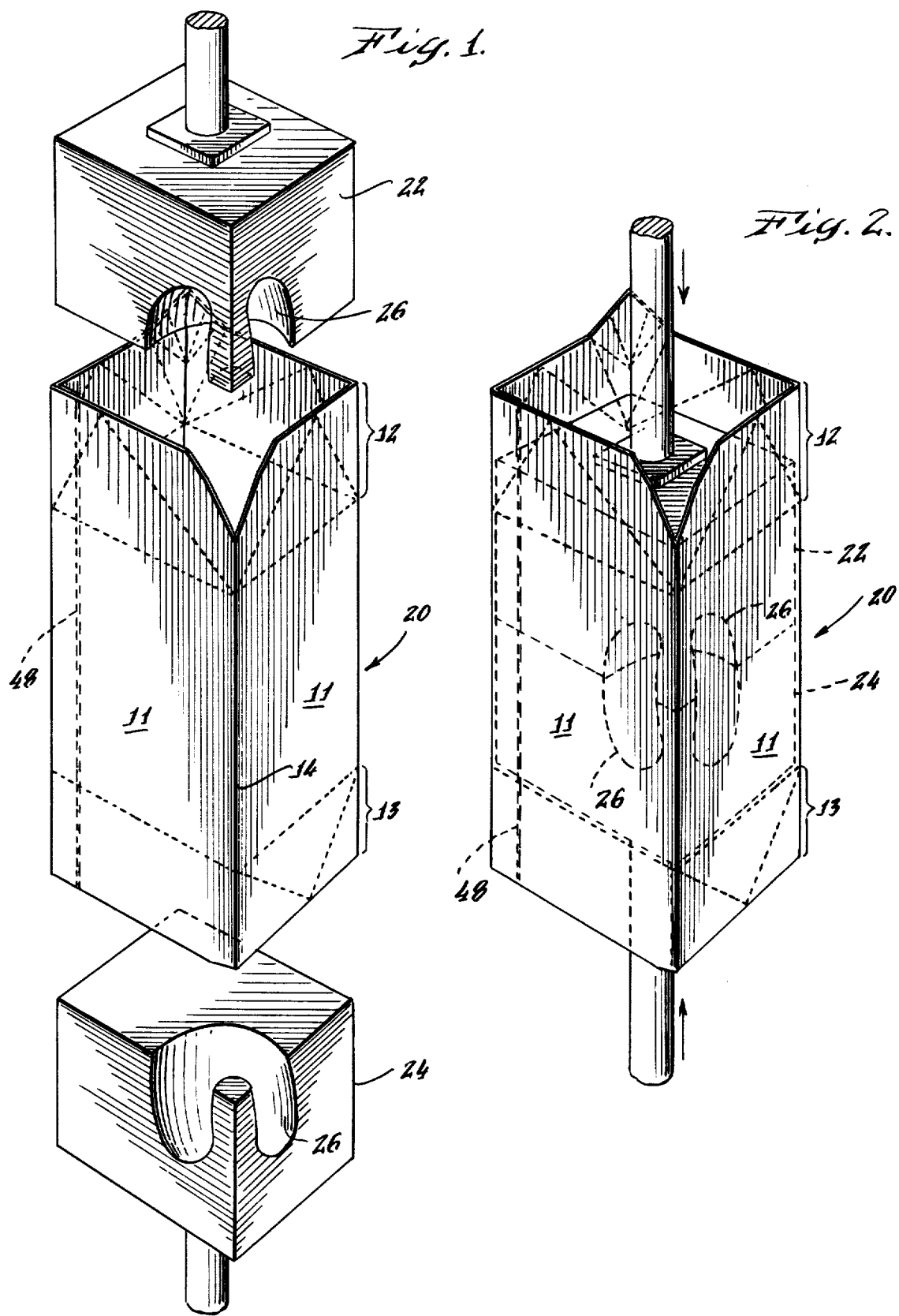

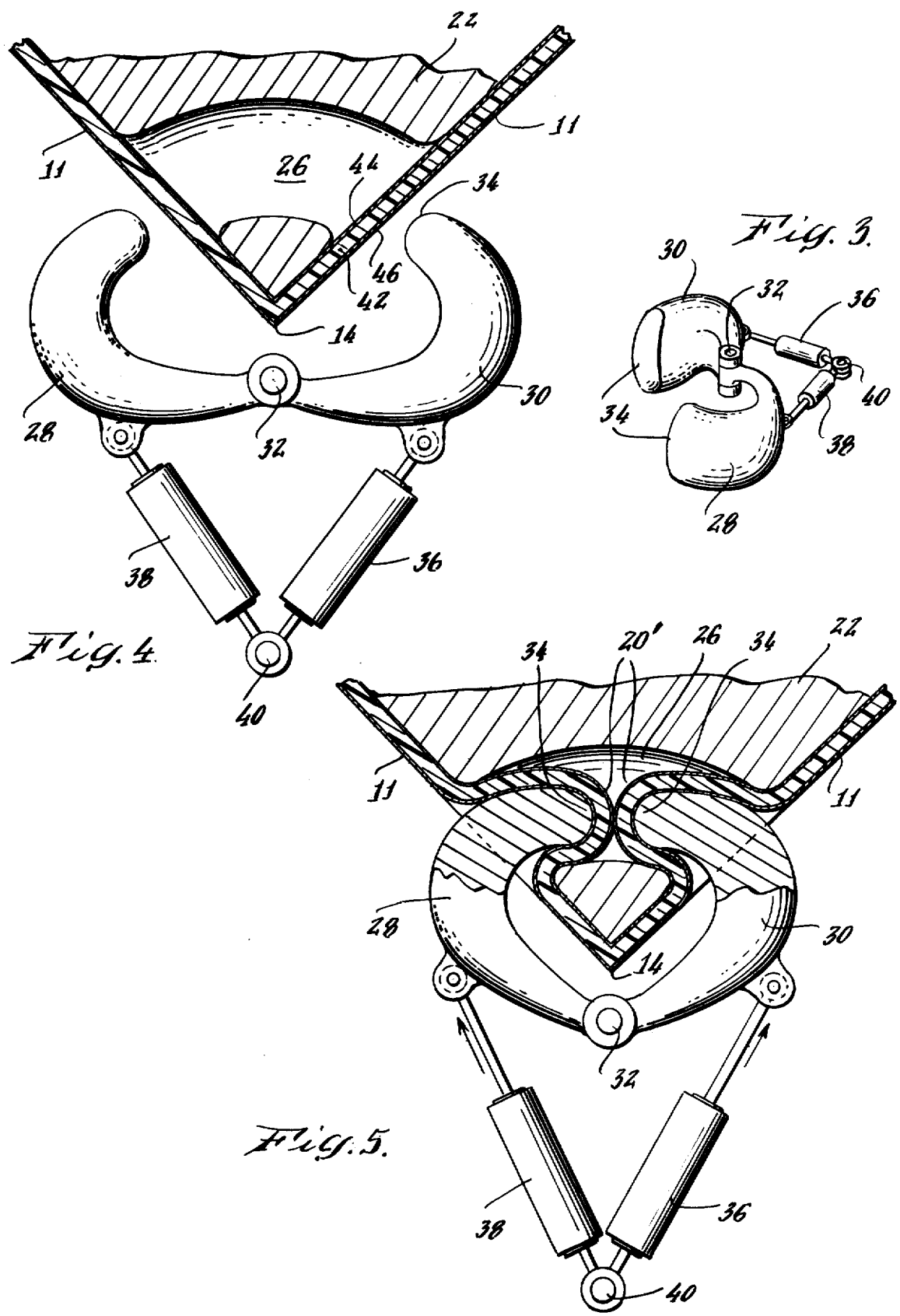

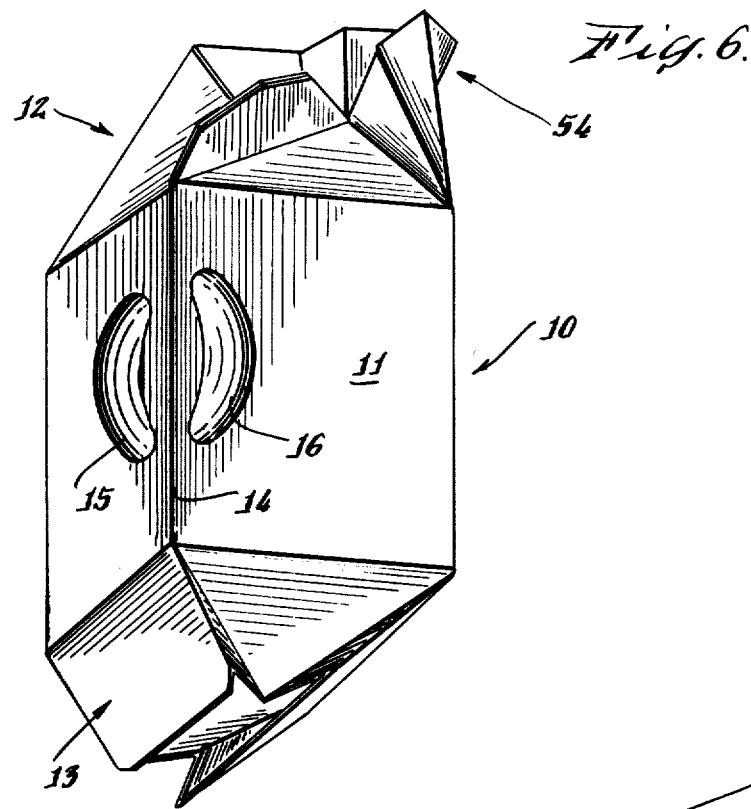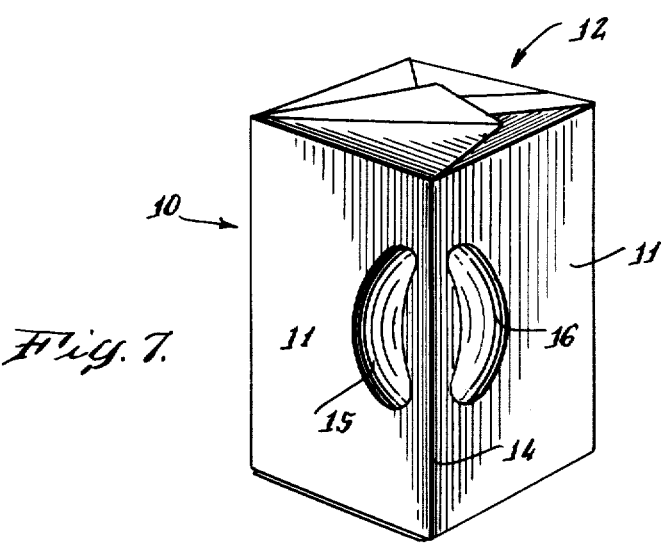

METHOD AND APPARATUS FOR FORMING A PLASTIC FLUID CONTAINER WITH AN INTEGRAL HANDLE

This is a division of application Ser. No. 178,525 filed Aug. 15, 1980, now U.S. Pat. No. 4,334,942.

BACKGROUND OF THE INVENTION

1. Field of the Invention

This invention relates to a method and apparatus for thermoforming a pair of integral handles on an all-plastic carton or container, and more particularly, a carton or container used to house milk, orange juice, and similar liquids in order to facilitate the pouring of the contents from the container.

2. Description of the Prior Art

For many years, cartons for milk and similar liquids were formed in part by setting up a preformed paper blank with the bottom of the carton closed and dipping the carton in molten paraffin to seal it. Thereafter, the carton was filled and its top closed.

The wax or paraffin coated carton has been almost entirely supplanted by a heat sealable thermoplastic coated, paperboard carton. The manufacture of the latter carton is different from the wax coated carton in several material respects. Instead of applying the sealing coating after the carton is almost completely formed, the coating of thermoplastic is applied to a paperboard web by extruding it as a thin film onto the paperboard web as one of the earliest steps in the formation of the carton and before any of the other steps are performed such as cutting a blank from the web, scoring and folding it, and the like. After coating, the web is cut into blanks, which are scored and folded into cartons and its bottom structure is sealed by applying heat to the overlapping flaps or panels by which the bottom structure is formed, the heat causing the thermoplastic to flow between adjacent surfaces to seal the same. Such cartons are usually formed with a gable top, or one which when unfolded forms an integral pouring spout along one entire sidewall. The top is folded and sealed along a ridge line by heating the thermoplastic coating.

Such carton details, per se, and the manner of assembly thereof are fully disclosed in U.S. Pat. Nos. 3,120,335 and 3,116,002, which disclosures are incorporated herein by reference. As shown in detail in these patents, the carton bottom structure is formed by folding panels transversely across the bottom of the carton, the panels being folded on score lines. The bottom structure is completed by applying heat and pressure to the panels which are folded upon one another. The thermoplastic which has been applied to the paperboard fuses during the application of heat and pressure to form a sealed bottom structure. The top structure is also folded about score lines and adjacent surfaces fused to seal the liquid contents in the carton. It can be opened in such a way as to form the pouring spout. After the carton bottom structure has been formed, the carton is filled with milk or other liquid and then the top seal is formed by folding the gable top panels on score lines and fusing adjacent surfaces.

More recently, in lieu of paperboard, such gable top containers have been formed from all-plastic material, as disclosed specifically in U.S. Pat. No. 4,126,262. As disclosed, a thermoplastic core of polyolefin, polyvinyl chloride, polystyrene, polyvinyl acetate and copolymers thereof is sandwiched between outer layers of low density polyethylene. Such material can be scored, cut and folded in the same manner as the thermoplastic coated paperboard, but does not exhibit the problems caused by wetting of the paperboard, such as pinhole leaks, deformation of shape, and the like, discussed more fully in the patent which is also incorporated herein by reference.

Such cartons are somewhat inconvenient to handle, especially in the larger gallon sizes which have become more desirable to the consumer because of decreased cost in buying milk or other food liquids in quantity. Not only are such filled cartons heavy to carry, but upon opening of the gable top to pour the contents, the large bulk of the side of the carton precludes the side of the carton from being readily grasped to tilt the carton.

Accordingly, users have resorted to pivotable or tiltable racks which support the carton while pouring the contents, leading to increased cost and bother in their use.

An alternative is to provide an integral handle on the gable top of the carton. However, this requires additional material to be utilized in forming the blank, which is uneconomical, and presents other manufacturing problems related to effecting a proper seal of the gable top so as to be able to unfold the same to provide a pouring spout for the container. The problems associated with providing such a construction are detailed in copending application Ser. No. 955,809, filed Oct. 27, 1978, now U.S. Pat. No. 4,214,697, assigned to the same assignee as the present application, which is also incorporated herein by reference. As indicated in the copending application, one serious problem in manufacturing a blank with an integral handle secured to the gable top is the manner in which the blanks are laid out and cut from a web, without undue waste.

Because of the difficulty in providing an integral carrying handle on a gable top container, many container manufacturers have discarded the use of thermoplastic coated, paperboard or all-plastic, laminated type containers and opted to blow-mold a container, particularly in the one-gallon size or larger, because it can readily be provided with an integral handle structure to carry the container and to hold the container while pouring its contents.

SUMMARY OF THE INVENTION

Accordingly, this invention relates to a method and apparatus for providing an integral carrying and pouring handle for a fluid container, such as a milk carton or the like in which the handle is thermoformed or impressed on two adjacent sidewall panels of an otherwise standard shaped, all-plastic container. The handles comprise substantially kidney-shaped depressions in the adjacent sidewall panels which can be grasped by the fingers to lift the carton while pouring. When lifting and tilting the carton by grasping the kidney-shaped depressions, the other hand of the pourer, if desired or necessary, depending on the size of the container, can be placed beneath the carton bottom to provide additional support.

The apparatus for forming the handles includes a pair of mandrels inserted through opposite ends of a tubular enclosure formed from the carton blank. The mandrels are provided with a toroidal shaped cavity where they meet inside the enclosure. The enclosure is heated and a pair of complementary shaped dies are rotated exteriorly of the enclosure into the toroidal cavity in the mandrels on adjacent sidewalls of the carton to form the handle depressions.

By virtue of forming the handles in the manner specified, blanks for the container can be shipped in collapsed form and erection and fabricating equipment for the blanks already in place in a user's factory, such as a dairy, can be utilized to erect the containers. The apparatus for the thermoforming operation to provide the handles can be integrated directly with such conventional machinery. Further, complete container decoration is still provided for since the printing is done while the blank is in flat or sheet form.

BRIEF DESCRIPTION OF THE DRAWINGS

Further objects and advantages of the invention will become apparent from the following description and claims, and from the accompanying drawings, wherein:

FIG. 1 is a perspective view of a portion of the apparatus of the present invention prior to insertion in a carton enclosure for forming the enclosure with a pair of handles on adjacent sidewalls;

FIG. 2 is a view similar to FIG. 1 with the mandrels inserted into the interior of the carton;

FIG. 3 is a perspective view of a pair of dies used with the mandrels illustrated in FIGS. 1 and 2 to deform the carton material into a toroidal cavity in the facing mandrels to form the handles;

FIGS. 4 and 5 are cross-sectional views through the carton and mandrels of FIG. 2 illustrating the sequential rotation of the dies of FIG. 3 to deform the carton material;

FIG. 6 is a perspective view of the tubular enclosure of FIG. 2 after the handles have been deformed in the sidewalls thereof and the top and bottom structure partially folded; and FIG. 7 is a perspective view of the completely folded carton of FIG. 6.

DETAILED DESCRIPTION OF THE PREFERRED EMBODIMENT

Referring now to the drawings in detail, wherein like numerals indicate like elements throughout the several views, a carton 10 having a pair of handles 15, 16 formed in accordance with the present invention is illustrated in FIGS. 6 and 7.

The carton 10 has vertical walls 11, an integral top structure 12, which when unfolded forms an integral pouring spout 54, and a bottom structure 13, which when folded and sealed, permits filling of carton 10 with a fluid, such as milk, orange juice or the like. The top and bottom structures 12 and 13 are folded as fully disclosed in copending application Ser. No. 178,071, filed in the name of Kenneth P. Thompson on Aug. 14, 1980, now U.S. Pat. No. 4,327,861, entitled "FLUID CONTAINER" and assigned to the same assignee as the present application. This application disclosure is incorporated herein by reference; however, the detailed top and bottom structures disclosed therein do not form any part of the present invention, but are referred to for purposes of completion in describing the carton 10.

Two of the adjacent perpendicular sidewalls 11 of the carton 10 are provided with semi-ovoid or semi-elliptical indentations or depressions 15, 16 forming handles for facilitating the pouring of the contents of carton 10 through spout 54. The depressions 15, 16 face each other in perpendicular planes separated by an upright edge 14 of carton 10. As shown in FIGS. 5, 6 and 7, the depressions, when formed in the adjacent carton sidewalls 11, are actually kidney-shaped as the central portion of each of the semi-ovoid or semi-elliptical depressions 15, 16 is more indented or deeper towards its center portion along the length of each of the depressions.

The kidney-shaped depressions 15, 16 are thermoformed in the score line 14 adjacent to sidewalls 11 after an all-plastic carton blank is formed into a tube 20 and a pair of rectangular mandrels 22, 24 (FIGS. 1 and 2) are inserted downwardly into the interior of the tube 20 from each end of the tube until they meet and mate. Each mandrel 22, 24 contains half of a torus-shaped cavity 26 which is completed within the interior of the tube 20 adjacent the sidewall panels 11 to be formed with the kidney-shaped indentations 15, 16, when the mandrels 22, 24 abut as shown in FIG. 2. With the mandrels 22, 24 inserted within the interior of the carton tube 20, the all-plastic carton tube 20 is locally heated along the sidewall panels 11 to receive the indentations and exterior plugs or dies 28, 30 (FIG. 3) pivotably connected about central hinge 32 and each having a semi-ovoid or semi-elliptical face 34. The dies 28, 30 are rotated into contact with each of the panels 11 on opposite side of the upright fold line 14 by an air cylinder 38, 36, respectively, pivotably connected to the dies 28, 30 and to each other by a hinge 40, to pound and deform the carton material of a sidewall 11 into the torus-shaped cavity formed in the mandrels 22, 24 placed inside the carton tube 20, to thermoform the indented kidney-shaped handle depressions 15, 16.

The result, as shown in FIGS. 5, 6 and 7 is a pair of kidney-shaped depressions in each of the sidewall panels 11 separated by a post 20'.

In view of the thermoforming process used to form the handles or depressions 15, 16, the carton tube 20 is formed from an all-plastic, thermodeformable and thermosealable laminate construction as disclosed specifically in U.S. Pat. No. 4,126,262, which disclosure is incorporated herein by reference. Generally, the laminate construction includes a thermoplastic core 42 selected from the group consisting of polyolefin, polyvinyl chloride, polystyrene, polyvinyl acetate and copolymers thereof sandwiched between outer layers 44 and 46 of low density polyethylene. Such material can be scored, cut and folded in the same manner as thermoplastic coated paperboard.

The tube 20 is folded into its tubular form as illustrated in FIGS. 1 and 2 by folding each rectangular panel 11 along the vertical score lines 14 forming the edges of each panel. One of the score lines 14 is connected to a rectangular glue flap 48 which is adhered by heat and pressure to the interior surface of the other remote end panel 11 to form the rectangular parallelopiped tubular enclosure of FIGS. 1 and 2. After the handles 15 and 16 are thermoformed, top and bottom structures 12 and 13 are then folded along appropriately formed score lines, as disclosed in my copending application identified above and sealed, so that the carton 10 can be filled with its fluid contents.

What is claimed as new is:

1. Apparatus for forming a plurality of handles in a container comprising:
    an upper mandrel having walls which define a generally semi-toroidal cavity extending upwardly from a bottom surface thereof,
    a lower mandrel adapted to mate within the interior of a container blank tube with said upper mandrel, said lower mandrel including walls which define a generally semi-toroidal shaped cavity extending downwardly from the upper surface thereof, and a pair of dies hinged to each other and rotatable with respect to each other about a vertical axis, each of said dies having a surface shaped complementary to the toroidal-shaped cavities in said abutted mandrels so as to deform separated portions of the carton tube into said mandrel cavities to form a pair of handle portions on said container blank.

2. The apparatus of claim 1 wherein each of said dies have a semi-ovoid surface.

3. The apparatus of claim 1 including
a fluid cylinder rotatably connected to each of said dies to rotate each die about said vertical axis.

4. The apparatus of claim 1 wherein each of said mandrels is substantially rectangular in cross-section.

* * * * *